Patented Jan. 3, 1933

1,892,980

UNITED STATES PATENT OFFICE

HENRY HANBURY EDWARDS, OF AUCKLAND, NEW ZEALAND

COMPOSITION FOR USE IN FORMING A GLAZING SOLUTION

No Drawing. Application filed June 11, 1931, Serial No. 543,752, and in New Zealand August 2, 1930.

This invention relates to compositions used in forming a glaze or vitreous coating on articles for the purpose of reducing the porosity thereof, so as to prevent loss by absorption or leakage of liquids or gases contacting with said articles, besides preventing contamination of the latter by contacting liquids, oils, fats or gases, and provides an improved composition for the aforesaid purpose.

According to the invention the composition comprises casein, borax, trisodium phosphate, hexamethylenetetramine, oil of sassafras, and a non-drying oil.

The above stated ingredients are combined in the proportions of 100 lbs. (avoirdupois) of casein; from 7 to 15 lbs., but preferably 10 lbs. (avoirdupois) of each of the borax and trisodium phosphate; from ½ lb. to 8 lbs. (avoirdupois) of hexamethylenetetramine; 1 ounce (liquid measure) of oil of sassafras; 1 to 5 ounces (liquid measure) of a non-drying oil; and a quantity of water.

In order to produce the composition, the casein, borax, trisodium phosphate and hexamethylenetetramine, are introduced into a mixer and after being thoroughly intermixed are ground to a state of division, which will enable them to be passed through a 60 mesh screen.

The combined and ground ingredients are then returned to the mixing apparatus and while in motion therein are sprayed with the oil of sassafras and the non-drying oil, preferably castor oil.

The combination of the ingredients, as above described, results in the production of a powder, which when mixed with warm water, the weight of which is from 4 to 6 times greater than the weight of the before enumerated ingredients combined in the proportions stated, provides a solution capable of being applied to articles by dipping the same in the solution or by spraying the latter on the articles.

If necessary or desirable, the articles can be further treated with a formaldehyde solution to further harden and increase the insolubility of the glaze, said formaldehyde solution preferably consisting of one part of 40 per cent formaldehyde and two parts of water.

The solution is suitable for applying to beer, wine and tallow casks, also to articles made of cardboard, wood pulp, wood, leather, paper, metal, wall board, canvas and the like, or to any articles or material where reduction of porosity is necessary or desirable.

The solution can also be used as an adhesive and as a stiffening medium on articles of varying kinds and natures.

What I do claim and desire to secure by Letters Patent of the United States of America is:—

1. A composition adapted for use in forming a glazing solution, consisting of 100 lbs. (avoirdupois) of casein; 7 to 15 lbs. (avoirdupois) borax; 7 to 15 lbs. (avoirdupois) trisodium phosphate; ½ lb. to 8 lbs. (avoirdupois) hexamethylenetetramine; 1 ounce (liquid measure) of oil of sassafras; and 1 to 5 ounces (liquid measure) of a non-drying oil.

2. A method of preparing a glazing solution comprising mixing 100 lbs. casein, 7 to 15 lbs. borax, 7 to 15 lbs. trisodium phosphate and ½ to 8 lbs. hexamethylenetetramine all in dry state, grinding said ingredients, and spraying the combined and ground ingredients with about 1 ounce (liquid measure) oil of sassafras and 1 to 5 ounces (liquid measure) of castor oil diluted in warm water to an amount 4 to 6 times the combined weight of said ingredients.

In testimony whereof he has affixed his signature.

HENRY HANBURY EDWARDS.